United States Patent
Hall

(10) Patent No.: US 8,615,611 B2
(45) Date of Patent: Dec. 24, 2013

(54) DEVICES AND METHODS FOR TRANSMITTING USB DATA OVER DISPLAYPORT TRANSMISSION MEDIA

(75) Inventor: Aaron T. J. Hall, North Vancouver (CA)

(73) Assignee: Icron Technologies Corporation, Burnaby (CA)

( * ) Notice: Subject to any disclaimer, the term of this patent is extended or adjusted under 35 U.S.C. 154(b) by 0 days.

(21) Appl. No.: 13/540,384

(22) Filed: Jul. 2, 2012

(65) Prior Publication Data

US 2013/0275629 A1 Oct. 17, 2013

Related U.S. Application Data

(60) Provisional application No. 61/624,920, filed on Apr. 16, 2012.

(51) Int. Cl.
*G06F 13/42* (2006.01)

(52) U.S. Cl.
USPC .................................. 710/8; 710/66; 710/72

(58) Field of Classification Search
None
See application file for complete search history.

(56) References Cited

U.S. PATENT DOCUMENTS

| | | | |
|---|---|---|---|
| 7,841,776 B2 * | 11/2010 | DiFonzo et al. | 385/57 |
| 7,904,620 B2 * | 3/2011 | Yao et al. | 710/65 |
| 7,918,689 B2 | 4/2011 | Sloey | |
| 8,094,684 B2 * | 1/2012 | Lu et al. | 370/492 |
| 8,151,018 B2 * | 4/2012 | Mohanty et al. | 710/51 |
| 8,255,576 B2 * | 8/2012 | Siulinski et al. | 710/2 |
| 8,266,335 B2 * | 9/2012 | Kitano et al. | 710/15 |
| 2007/0206640 A1 * | 9/2007 | Egan et al. | 370/479 |
| 2011/0150055 A1 * | 6/2011 | Qu et al. | 375/220 |
| 2011/0243035 A1 * | 10/2011 | Hall et al. | 370/276 |
| 2011/0256756 A1 * | 10/2011 | Lu et al. | 439/449 |
| 2012/0079140 A1 * | 3/2012 | Bar-Niv et al. | 710/16 |
| 2012/0113573 A1 * | 5/2012 | Ko et al. | 361/679.01 |

OTHER PUBLICATIONS

Hruska, J., "AMD demos new, remarkably irrelevant, Lightning Bolt concept at CES," Jan. 13, 2012, © 2012 <http://www.extremetech.com/computing/113863-amd-demos-new-remarkably-irrelevant-lightning-ExtremeTech>, [retrieved Sep. 6, 2012], 2 pages.

(Continued)

*Primary Examiner* — Cheng-Yuan Tseng
(74) *Attorney, Agent, or Firm* — Christensen O'Connor Johnson Kindness PLLC

(57) ABSTRACT

Devices and methods for communicating DisplayPort information and non-DisplayPort information over a DisplayPort cable are provided. In some embodiments, an integration device includes a main link switching circuit configured to selectively couple lanes of the DisplayPort main link to a DisplayPort source when configured to operate in a first mode, and to a non-DisplayPort source when configured to operate in a second mode. In some embodiments, the integration device may be configured to hot swap between the first mode and the second mode after an initial connection has been established.

15 Claims, 8 Drawing Sheets

(56) References Cited

OTHER PUBLICATIONS

Kobayashi, A., "DisplayPortTM Ver.1.2 Overview," Presented at the DisplayPort Developer Conference, Taipei, Taiwan, Dec. 6, 2010, 34 pages.

Portnoy, S, "CES 2012: AMD Delivers a Lightning Bolt Strike to Intel's Thunderbolt," Laptops & Desktops, Jan. 15, 2012, <http://www.zdnet.com/blog/computers/ces-2012-amd-delivers-a-lightning-bolt-strike-to-intels-thunderbolt/7388>, [retrieved Sep. 12, 2012], 1 page.

Shimpi, A.L., "AMD's Lightning Bolt: Low Cost Thunderbolt Alternative for USB 3.0/DP" <http://www.anandtech.com/show/5413/amds-lightning-bolt-low-cost-thunderbolt-alternative-for-usb-30dp#DATH0RpllaFA2olo.03>, [retrieved Sep. 6, 2012], 1 page.

Thunderbolt® Technology, Intel Technology Brief, Interconnect Technolgoy, <http://www.intel.com/content/www/us/en/architecture-and-technology/thunderbolt/thunderbolt-technology-brief.html>, [retrieved Sep. 6, 2012], 4 pages.

* cited by examiner

DEVICES AND METHODS FOR TRANSMITTING USB DATA OVER DISPLAYPORT TRANSMISSION MEDIA

CROSS-REFERENCE TO RELATED APPLICATION

This application claims the benefit of Provisional Application No. 61/624,920, filed Apr. 16, 2012, the entire disclosure of which is hereby incorporated by reference herein.

BACKGROUND

DisplayPort information includes any information expressed in accordance with a DisplayPort standard. DisplayPort standards provide specifications for connectors, cables, and data communication protocols for use in delivering digital packetized video streams from a DisplayPort source, such as a video processor of a computing device, to a DisplayPort sink, such as a display. Said video streams are transmitted via a main link that includes one, two, or four differential data pairs, identified as Lanes 0, 1, 2, and 3. DisplayPort standards also provide for at least one additional differential data pair used for a bi-directional, half-duplex auxiliary channel (identified as the AUX line) usable for communicating control data between the DisplayPort source and the DisplayPort sink, and at least one additional conductor usable for communicating a hot plug detect (HPD) signal between the DisplayPort source and the DisplayPort sink.

USB information includes any information expressed in substantial accordance with a USB standard (e.g., Intel et al., Universal Serial Bus Specification, Revision 1.0, January 1996; updated as Revision 1.1 in September 1998; further updated as Revision 2.0 in April 2000; further updated as Revision 3.0 in November 2008, and subsequent updates and modifications—hereinafter collectively referred to as the "USB Specifications", which term can include future modifications and revisions). The USB Specifications are non-proprietary and are managed by an open industry organization known as the USB Forum. The USB Specifications establish basic criteria to be met in order to comply with the USB standards.

Revision 1.1 of the USB Specification specifies that a single USB domain shall support up to 127 devices operating over a shared medium providing a maximum bandwidth of 12 Mbps. Revision 2.0 increases the maximum bandwidth to 480 Mbps while maintaining compatibility with devices manufactured under the criteria of Revision 1.1. Under Revision 3.0 of the USB Specifications, SuperSpeed connections are provided that use a 5-Gbps signaling rate. Under the USB Specifications, a host controller that supports a maximum signaling rate of 12 Mbps is referred to as a full-speed host. A host controller that supports a signaling rate of 480 Mbps is referred to as a high-speed host. A full-speed host controller conforming to the USB Specifications supports two classes of devices, namely, low-speed devices and full-speed devices. A high-speed host controller conforming to the USB Specifications supports three classes of devices, namely, low-speed devices, full-speed devices, and high-speed devices. Low-speed devices have a maximum signaling rate of 1.5 Mbps, full-speed devices have a maximum signaling rate of 12 Mbps, and high-speed devices have a maximum signaling rate of 480 Mbps. A SuperSpeed host controller conforming to the USB specifications may support all three earlier classes of devices, as well as SuperSpeed devices. Low-speed, full-speed, and high-speed USB communication takes place over a single differential data pair. SuperSpeed USB communication is established and takes place over an additional differential data pair used for data transmission and an additional differential data pair used for data receipt.

Many computing devices, such as desktop computers and/or the like, communicate with peripheral devices over both DisplayPort and USB connections. This leads to an undesirable proliferation in cabling and data ports for connecting the computing device with the peripheral devices. What is desired is a way to transmit both DisplayPort and USB data over a single cable that supports low-speed, full-speed, high-speed, and SuperSpeed USB communication.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, an integration device for selectively communicating DisplayPort and non-DisplayPort information over a DisplayPort cable is provided. The device comprises a main link switching circuit and a controller. The main link switching circuit is configured to selectively couple channels of a first DisplayPort cable and channels of a non-DisplayPort cable to channels of a second DisplayPort cable. The controller is configured to cause the main link switching circuit to couple the channels of the first DisplayPort cable to the channels of the second DisplayPort cable when the device is configured to operate in a first mode, and to cause the main link switching circuit to couple the channels of the non-DisplayPort cable to the channels of the second DisplayPort cable when the device is configured to operate in a second mode.

In some embodiments, a method of reserving DisplayPort main link channels for the transmission of non-DisplayPort information is provided. The method comprises receiving display port configuration data (DPCD) from a DisplayPort sink device, altering the DPCD, and transmitting the altered DPCD to a DisplayPort source device to affect a number of main link channels used by the DisplayPort source device.

In some embodiments, a computer-readable storage medium having computer-executable instructions stored thereon is provided. If the instructions are executed by one or more processors of a computing device, the instructions cause the computing device to perform the above-described method of reserving DisplayPort main link channels for the transmission of non-DisplayPort information.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1A:
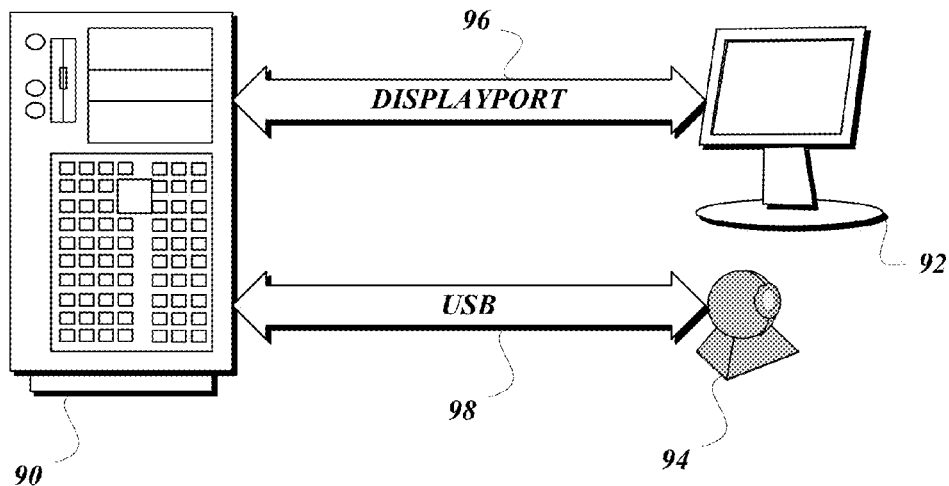
FIG. 1A is a schematic diagram that illustrates a problem solved by various embodiments of the present disclosure.

FIG. 1A is a schematic diagram that illustrates a problem solved by various embodiments of the present disclosure. A computing device 90 is connected to a DisplayPort sink device 92 and a USB device 94. The computing device 90 may be any type of computing device that communicates via both DisplayPort and USB, such as a desktop computer, a laptop computer, a notebook computer, a netbook, a tablet computer, a server computer, a video card installed in a host computing device, a mobile device, and/or the like. The illustrated DisplayPort sink device 92 is a flat-screen monitor, but may be any suitable device that communicates via DisplayPort, such as other types of monitors, projectors, televisions, and/or the like. The illustrated USB device 94 is a webcam, but any other type of device that communicates via USB, such as a storage device, a microphone, a network adapter, an input device, a USB hub, and/or the like, may instead be used. As illustrated, the DisplayPort sink device 92 is connected to the computing device 90 by a DisplayPort cable 96, and the USB device 94 is connected to the computing device 90 by a USB cable 98. In a typical embodiment, the DisplayPort cable 96 is connected to a DisplayPort controller of the computing device 90, and the USB cable 98 is connected to a USB controller of the computing device 90. As can be seen, the DisplayPort communication and the USB communication are transmitted over two separate cables.

Figure 1B:
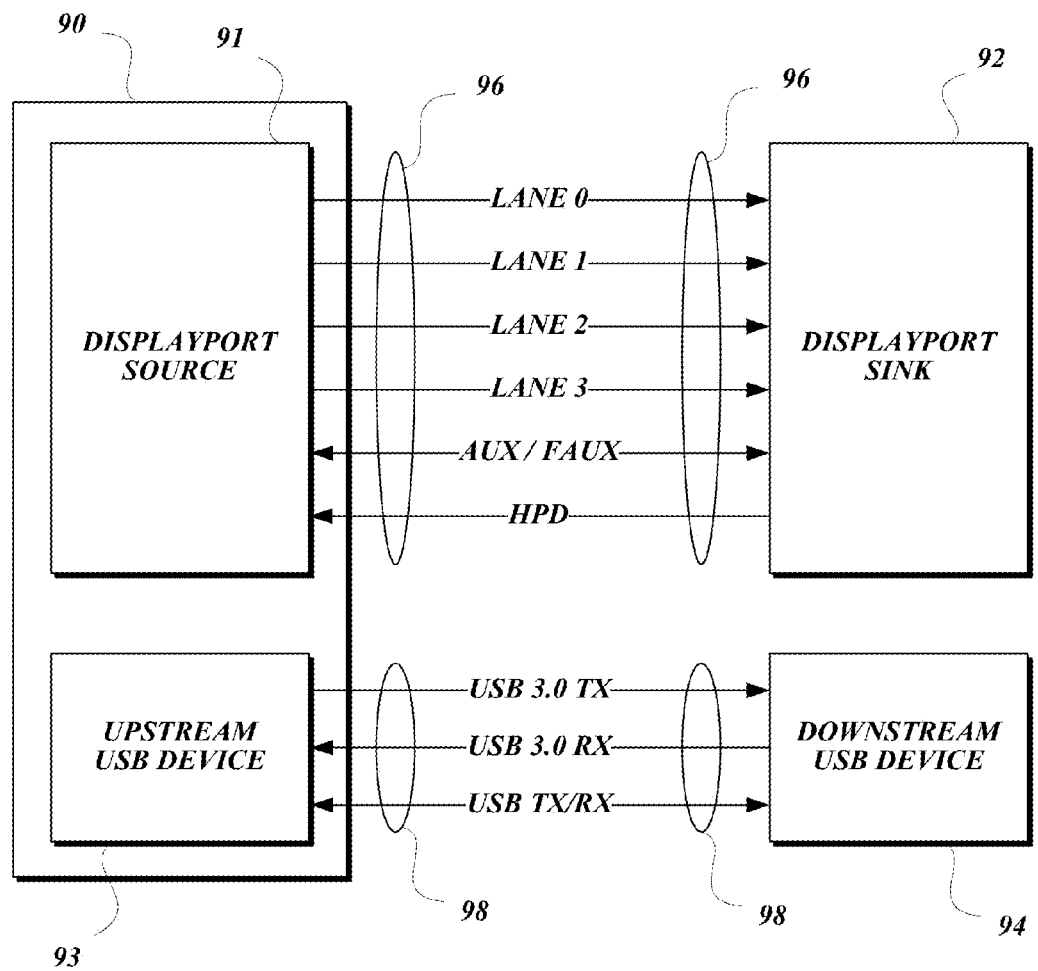
FIG. 1B is a schematic diagram that illustrates further details of the problematic connections of FIG. 1A.

FIG. 1B is a schematic diagram that illustrates further details of the problematic connections of FIG. 1A. Illustrated as components of the computing device 90 are a DisplayPort source 91 and an upstream USB device 93. In some embodiments, the DisplayPort source 91 is a component of a DisplayPort controller, and the upstream USB device 93 is a component of a USB controller, USB hub, and/or the like. The DisplayPort source 91 is communicatively coupled to a DisplayPort sink device 92, such as the display device illustrated in FIG. 1A. The upstream USB device 93 is communicatively coupled to a downstream USB device 94, such as the webcam illustrated in FIG. 1A.

Each arrow in FIG. 1B (other than the HPD arrow) represents a differential pair, and the ovals indicate that the differential pairs are contained in a single cable. Though each differential pair may be used in a variety of ways, the arrowheads in FIG. 1B indicate a primary direction of data communication. The ovals indicate that the six illustrated differential pairs between the DisplayPort source 91 and the DisplayPort sink 92 are combined into a single cable (a DisplayPort cable 96), and that the three illustrated differential pairs between the upstream USB device 93 and the downstream USB device 94 are combined into a single cable (a USB cable 98).

The first four differential pairs of the DisplayPort cable 96—Lane 0, Lane 1, Lane 2, and Lane 3—make up a main link, and are used to transmit data from the DisplayPort source 91 to the DisplayPort sink 92 in various combinations. The next differential pair of the DisplayPort cable 96—AUX/FAUX—is used to communicate command and status information between the DisplayPort source 91 and the DisplayPort sink 92. AUX is a slower version of this communication, and FAUX (or Fast AUX) is a faster version of this communication. The last illustrated conductor of the DisplayPort cable 96—HPD—is used by the DisplayPort sink 92 to transmit a hot plug detect (HPD) signal, which may also serve as a way for the DisplayPort sink 92 to transmit an interrupt request. The arrow for the HPD conductor indicates at least one conductor used to carry the HPD signal.

The first differential pair of the USB cable 98—USB 3.0 TX—is used by the upstream USB device 93 to transmit SuperSpeed USB information to the downstream USB device 94, and the second differential pair of the USB cable 98—USB 3.0 RX—is used by the upstream USB device 93 to receive SuperSpeed USB information from the downstream USB device 94. A third differential pair of the USB cable 98—USB TX/RX—may be used to exchange low-speed, full-speed, and high-speed USB information between the upstream USB device 93 and the downstream USB device 94.

Both the DisplayPort cable 96 and the USB cable 98 may include additional conductors or differential pairs not illustrated herein. Similar to FIG. 1A, FIG. 1B also illustrates that the DisplayPort communication and the USB communication are sub-optimally carried over separate cables.

Figure 2:
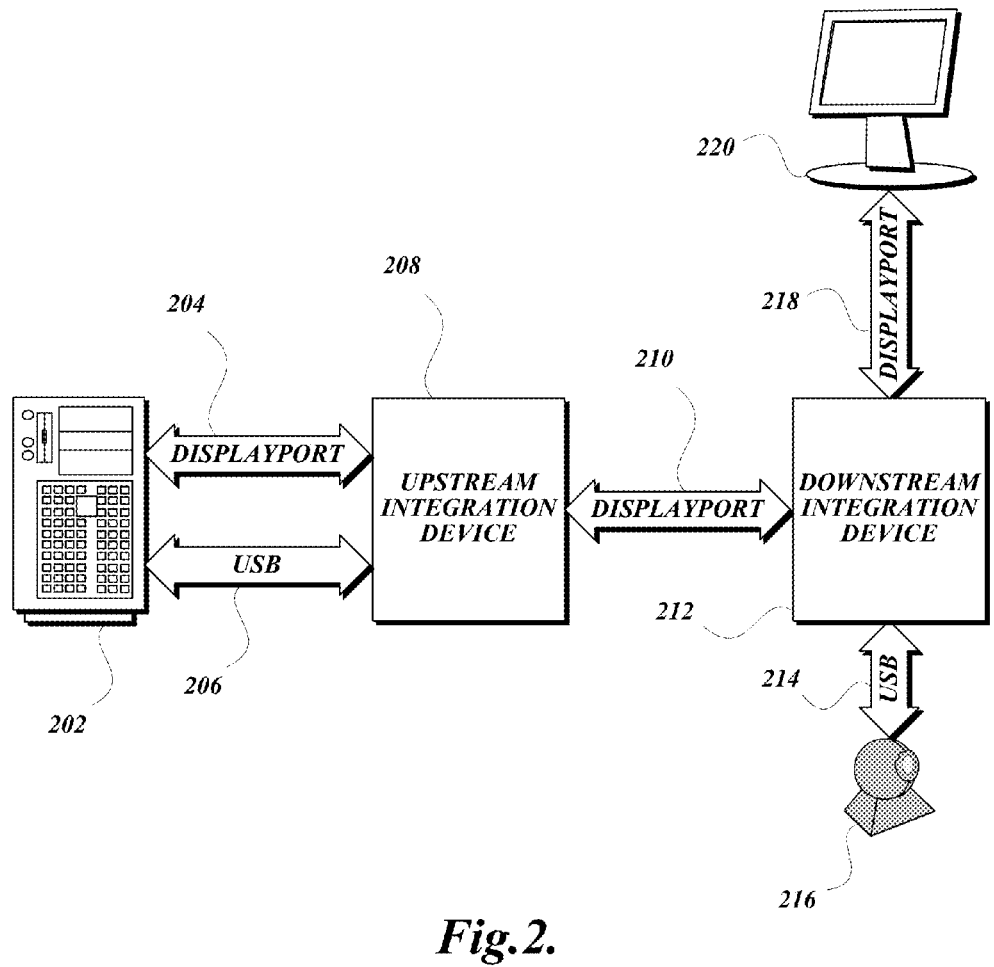
FIG. 2 is a schematic diagram that illustrates exemplary features of a technique for combining DisplayPort and USB signals for transmission over a single DisplayPort cable according to various aspects of the present disclosure.

FIG. 2 is a schematic diagram that illustrates exemplary features of a technique for combining DisplayPort and USB signals for transmission over a single DisplayPort cable according to various aspects of the present disclosure. Similar to the previous illustrations, a computing device 202 is communicatively coupled to a DisplayPort sink device 220 and a downstream USB device 216, such as the illustrated flat-screen monitor and webcam and/or the like illustrated above. However, in the embodiment illustrated in FIG. 2, the computing device 202 is coupled to the other devices via an upstream integration device 208 and a downstream integration device 212.

In some embodiments, a DisplayPort source cable 204 and a USB source cable 206 may be used to connect the computing device 202 to the upstream integration device 208. The upstream integration device 208 transmits both the DisplayPort signals and the USB signals over a single DisplayPort transit cable 210 to the downstream integration device 212. The downstream integration device 212 transmits the DisplayPort signals to the DisplayPort sink device 220 via a DisplayPort sink cable 218, and the USB signals to the downstream USB device 216 via a USB source cable 214. The terms "source," "sink," and "transit" are used to refer to cables herein for ease of discussion to refer to a "source," "sink," or "transit" location in the connection topology at which the associated cable resides, and not to identify any other features of the associated cable. For example, the DisplayPort source cable 204 is referred to as a "source" cable to indicate that it lies on the "source" side of the connection topology, but is otherwise similar to any other DisplayPort cable.

The particular connection topology of FIG. 2 is illustrated for ease of discussion only, as this connection topology clearly shows the logical interconnection between each component. In other embodiments, different connection topologies may be used. For example, in some embodiments, the upstream integration device 208 may be included as a part of the computing device 202, such that a single DisplayPort output port on the computing device 202 may be used to transmit both DisplayPort information and USB information. In some embodiments, the downstream integration device 212 may be included as a part of the DisplayPort sink device 220, and the DisplayPort sink device 220 may expose one or more USB ports to which the downstream USB device 216 may be coupled. Similarly, in some embodiments, the downstream integration device 212 may instead be included as a part of a downstream USB device 216, which may then expose one or more DisplayPort ports to which the DisplayPort sink device 220 may be coupled. In some embodiments, the downstream USB device 216 and the DisplayPort sink device 220 may be integrated into a single device, such as a display device that includes a webcam, and/or the like. Such a device may also include the downstream integration device 212 as a component, and may use internal circuitry to replace the DisplayPort sink cable 218 and the USB sink cable 214.

Figure 3:
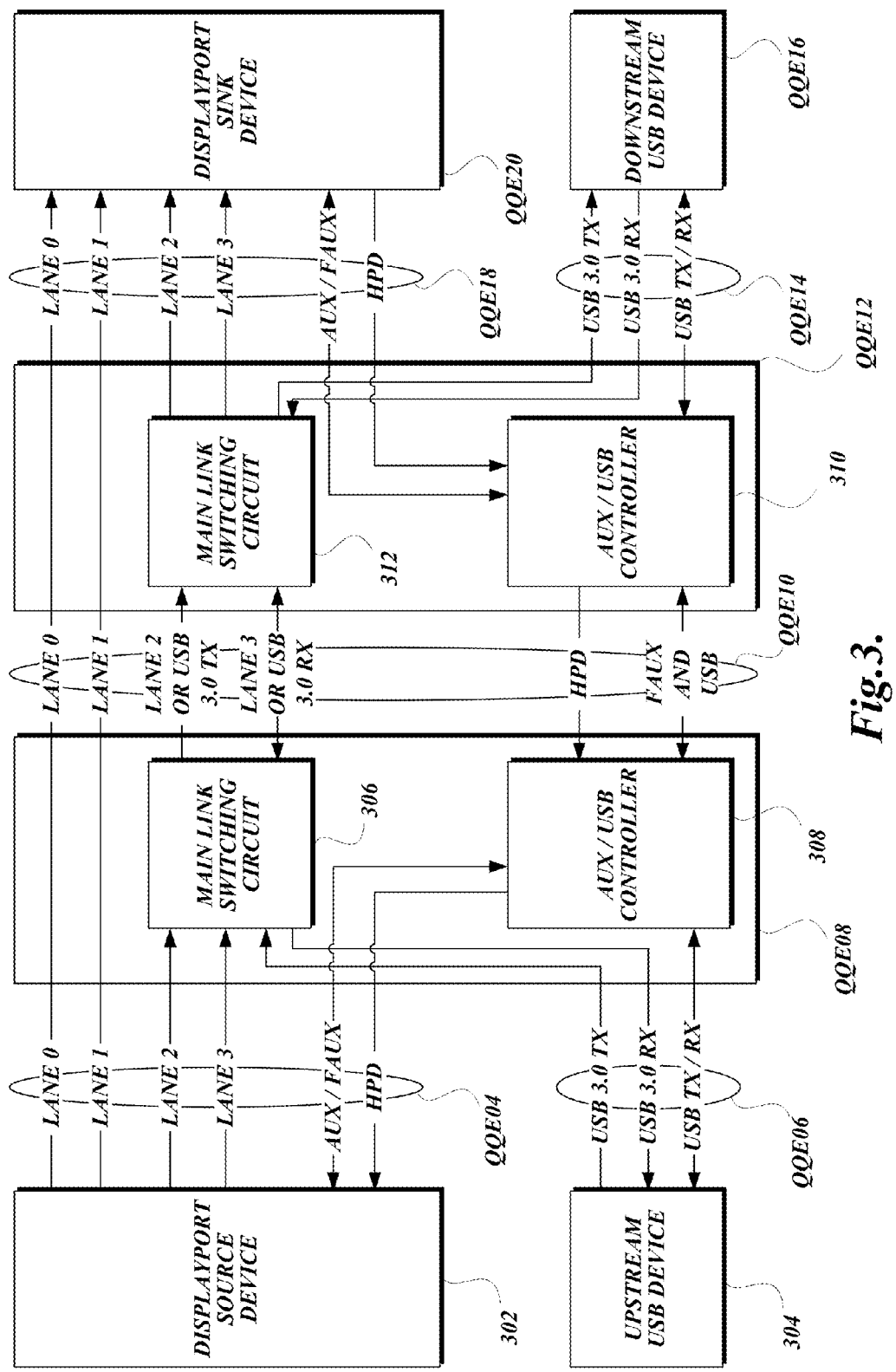
FIG. 3 is a schematic diagram illustrating an exemplary embodiment of communication between a computing device, a DisplayPort sink device, and a downstream USB device according to various aspects of the present disclosure.

FIG. 3 is a schematic diagram illustrating an exemplary embodiment of communication between a computing device 202, a DisplayPort sink device 220, and a downstream USB device 216 according to various aspects of the present disclosure. As illustrated, the computing device 202 includes a DisplayPort source device 302 and an upstream USB device 304. As above, the arrows indicate differential pairs (except for the HPD arrows, which indicate at least one conductor), the arrowheads indicate the most common direction of data flow over a given differential pair or conductor, and the ovals connecting the differential pairs and conductors indicate that the differential pairs and conductors are combined in a single cable. One of ordinary skill in the art will recognize that transmission paths indicated by arrows having a single arrowhead may sometimes transmit data in the opposite direction, and that arrows having a double arrowhead may sometimes transmit data in a single direction, half-duplex, full-duplex, and/or the like.

The upstream integration device 208 and the downstream integration device 212 each include an AUX/USB controller 308, 310 and a main link switching circuit 306, 312, respectively. With respect to the connections between the DisplayPort source device 302, the upstream USB device 304, and the upstream integration device 208, the Lane 2 and Lane 3 differential pairs of the DisplayPort source cable 204 are coupled to the main link switching circuit 306 of the upstream integration device 208, as are the USB 3.0 TX and USB 3.0 RX differential pairs of the USB source cable 206. The AUX/FAUX differential pair and the HPD conductor of the DisplayPort source cable 204 are coupled to the AUX/USB controller 308 of the upstream integration device 208, as is the USB TX/RX differential pair of the USB source cable 206. The Lane 0 and Lane 1 differential pairs of the DisplayPort source cable 204 are connected through the upstream integration device 208 to Lane 0 and Lane 1 differential pairs of the DisplayPort transit cable 210. Any other conductors present in the DisplayPort source cable 204 that are not illustrated in FIG. 3 may similarly be coupled directly through the upstream integration device 208 to the DisplayPort transit cable 210.

The connections between the downstream integration device 208, the DisplayPort sink device 220, and the downstream USB device 216 are similar to those discussed above, but in reverse. The Lane 2 and Lane 3 differential pairs of the DisplayPort sink cable 218 are coupled to the main link switching circuit 312 of the downstream integration device 212, as are the USB 3.0 TX and USB 3.0 RX differential pairs of the USB sink cable 214. The AUX/FAUX differential pair and the HPD conductor of the DisplayPort sink cable 218 are coupled to the AUX/USB controller 310 of the downstream integration device 212, as is the USB TX/RX differential pair of the USB sink cable 214. The Lane 0 and Lane 1 differential pairs of the DisplayPort sink cable 218 are connected through the downstream integration device 212 to Lane 0 and Lane 1 differential pairs of the DisplayPort transit cable 210, as are any other conductors present in the DisplayPort sink cable 218 that are not illustrated in FIG. 3.

The upstream integration device 208 and the downstream integration device 212 may be connected by a standard DisplayPort cable, such as DisplayPort transit cable 210. The DisplayPort transit cable 210 acts as a traditional DisplayPort cable with respect to at least the Lane 0 differential pair, the Lane 1 differential pair, and any other conductors not explicitly described herein. The differential pair traditionally used for Lane 2 communication is used to connect the main link switching circuit 306 of the upstream integration device 208 to the main link switching circuit 312 of the downstream integration device 208, and may carry either Lane 2 DisplayPort information or USB 3.0 TX information, depending on a mode in which the switching circuits are configured. In either case, the Lane 2 or USB 3.0 TX differential pair may transmit information from the upstream integration device 208 to the downstream integration device 212. The differential pair traditionally used for Lane 3 communication is used to connect the main link switching circuit 306 of the upstream integration device 208 to the main link switching circuit 312 of the downstream integration device 212, and may carry either Lane 3 DisplayPort information or USB 3.0 RX information, depending on a mode in which the switching circuits are configured. When carrying Lane 3 DisplayPort information, the Lane 3 or USB 3.0 RX differential pair may transmit information from the upstream integration device 208 to the downstream integration device 212. When carrying USB 3.0 RX information, the Lane 3 or USB 3.0 RX differential pair may transmit information from the downstream integration device 212 to the upstream integration device 208. The HPD differential pair of the DisplayPort transit cable 210 may transmit HPD signals between the upstream integration device 208 and the downstream integration device 212. The AUX/FAUX differential pair of the DisplayPort transit cable 210 may carry both USB and DisplayPort AUX information, as discussed further below.

The main link switching circuit 306 may operate in one of two modes. In a first mode, the main link switching circuit 306 couples the Lane 2 differential pair of the DisplayPort cable 204 to the Lane 2 or USB 3.0 TX differential pair of the DisplayPort transit cable 210, and couples the Lane 3 differential pair of the DisplayPort source cable 204 to the Lane 3 or USB 3.0 RX differential pair of the DisplayPort transit cable 210. In this first mode, the USB 3.0 TX differential pair and the USB 3.0 RX differential pair from the USB source cable 206 may be left functionally disconnected by the main link switching circuit 306. In a second mode, the main link switching circuit 306 couples the USB 3.0 TX differential pair of the USB source cable 206 to the Lane 2 or USB 3.0 TX differential pair of the DisplayPort transit cable 210, and couples the USB 3.0 RX differential pair of the USB source cable 206 to the Lane 3 or USB 3.0 TX differential pair of the DisplayPort transit cable 210. In this second mode, the Lane 2 differential pair and the Lane 3 differential pair of the DisplayPort source cable 204 may be left functionally disconnected by the main link switching circuit 306. As would be readily understood to one of ordinary skill in the art, in some embodiments, the USB 3.0 TX differential pairs could be coupled to the Lane 3 differential pair of the DisplayPort transit cable 210, while the USB 3.0 RX differential pairs could be coupled to the Lane 2 differential pair of the DisplayPort transit cable 210, and so on, without departing from the scope of the present disclosure.

In some embodiments, the AUX/USB controllers 308, 310 of the upstream integration device 208 and the downstream integration device 212, respectively, manage transmission of AUX and/or FAUX information, as well as transmission of USB information, between the upstream integration device 208 and the downstream integration device 212. In the case of the transmission of AUX and/or FAUX information along with low-speed, full-speed, or high-speed USB information, the AUX/USB controllers 308, 310 use a FAUX and USB differential pair of the DisplayPort transit cable 210 to exchange both the DisplayPort AUX/FAUX and the USB information using any suitable technique, such as packet interleaving, packet encapsulation, and/or the like. One example of a suitable technique for transmitting USB information along with AUX/FAUX information is described in co-pending, co-owned U.S. patent application Ser. No. 12/750,427, filed Mar. 30, 2010, which is incorporated by reference herein in its entirety for all purposes. Once the data is received, the AUX/USB controllers 308, 310 are configured to identify and send the data to the appropriate recipient (DisplayPort AUX/FAUX data is transmitted to the DisplayPort source device 302 or the DisplayPort sink device 220, and USB data is transmitted to the upstream USB device 304 or the downstream USB device 216). In the case of the transmission of SuperSpeed USB information, the AUX/USB controllers 308, 310 are configured to cause the main link switching circuits 306, 312 to switch from the first mode to the second mode, as will be discussed further below.

As all of the logic and circuitry used to switch between four-lane DisplayPort data transmission and USB 3.0 data transmission over Lane 2 and Lane 3 may reside within the upstream integration device 208 and the downstream integration device 212, embodiments of the present disclosure may advantageously utilize pre-existing connection hardware. For example, standard DisplayPort communications ports with standard DisplayPort pin-outs may be used, as may standard USB communications ports with standard USB pin-outs. As another example, standard DisplayPort cables may be used at any point herein where a DisplayPort cable is used, as may standard USB cables. The reuse of existing hardware may provide many advantages, including but not limited to ease of adoption, lowered costs, and/or the like. Further, the DisplayPort source device 302, the upstream USB device 304, the DisplayPort sink device 220, and the downstream USB device 216 may conform to the preexisting standards, and need not be modified in order to work with the integration devices 208, 212.

FIGS. 4A-4D illustrate an exemplary embodiment of a method 400 of transmitting non-DisplayPort signals over DisplayPort main link channels according to various aspects of the present disclosure. In the description of the method 400, the various differential pairs and other data transmission media illustrated in FIG. 3 are referred to interchangeably as "channels" for ease of discussion. In each case, the "channel" may include any appropriate transmission medium suitable for carrying the described information, such as a differential pair, a single conductor, an RF conductor, a fiber optic cable, and/or the like. The "source" channels include the channels described above within the DisplayPort source cable 204 and the USB source cable 206. The "transit" channels include the channels described above within the DisplayPort transit cable 210. The "sink" channels include the channels described above within the DisplayPort sink cable 218 and the USB sink cable 214. Also, in the description of the method 400, USB information is often discussed as a non-DisplayPort signal. Discussion of USB information is exemplary only, and in some embodiments, information other than USB information may be exchanged.

From a start block (FIG. 4A), the method 400 proceeds to a set of method steps 402 defined between a continuation terminal ("terminal A") and an exit terminal ("terminal B"). The set of method steps 402 describe steps in which a connection is established between a DisplayPort source device 302 and a DisplayPort sink device 220 via integration devices.

From terminal A (FIG. 4B), the method 400 proceeds to block 410, where an upstream integration device 208 is coupled to a downstream integration device 212 via a transit DisplayPort cable 210. At block 412, the upstream integration device 208 is coupled to a source DisplayPort device 302 via a source DisplayPort cable 204 and to an upstream USB 3.0 device 304 via a source USB cable 206. At block 414, the downstream integration device 212 is coupled to a sink DisplayPort device 220 via a sink DisplayPort cable 218 and to a downstream USB 3.0 device via a sink USB cable 214. In some embodiments, each of these cables may have been connected in different orders, or before the start of the method 400. In some embodiments, the cables may not be detachable, external cables, but may instead be hard-wired connections internal to the various devices.

The method 400 includes at least two techniques for communicating both DisplayPort information and non-DisplayPort information over the transit DisplayPort cable 210. One technique is that if USB information is to be transmitted, then a transit Lane 2 channel and a transit Lane 3 channel will be coupled to the respective USB channels, whereas if only DisplayPort information is to be transmitted, then the transit Lane 2 channel and the transit Lane 3 channel will be coupled to the respective DisplayPort channels. Another technique is to cause the DisplayPort source device 302 to only transmit DisplayPort information on Lane 0 and Lane 1 if USB information is to be transmitted on Lane 2 and Lane 3. Different embodiments of the method 400 may perform various steps related to each of these techniques, and may perform the steps in various orders and at various times during the establishment of communication. One of ordinary skill in the art will understand the various combinations and orders in which these steps may occur in embodiments of the present disclosure.

The method 400 proceeds to a decision block 416, where a determination is made whether the upstream integration device 208 and the downstream integration device 212 have been configured to operate in USB 3.0 mode. The integration devices 208, 212 may be configured to operate in USB 3.0 mode in any suitable way. In some embodiments, the integration devices 208, 212 may be placed in USB 3.0 mode via a configuration option such as a firmware setting, a hardware switch, and/or the like. As another example, in some embodiments the upstream integration device 208 and the downstream integration device 212 may both automatically detect whether a USB 3.0-capable device is coupled thereto. During a handshake between the upstream integration device 208 and the downstream integration device 212, status information may be exchanged that indicates whether a USB 3.0-capable device is coupled to each device. If both devices indicate that USB 3.0-capable devices are connected, then each integration device may place itself in USB 3.0 mode. In some embodiments, the integration devices 208, 212 may request and examine extended display information data (EDID) provided by the DisplayPort sink device 220. If the EDID indicates that the DisplayPort sink device 220 requires all four main link channels to provide adequate bandwidth to support the capabilities of the DisplayPort sink device 220 (such as, for example, a very high resolution), then the integration devices 208 may not provide the option of operating in the USB 3.0 mode. In some embodiments, the DPCD information may be considered by itself or along with the EDID when deciding whether to provide the option of operating in the USB 3.0 mode. In some embodiments, the EDID may be altered by the downstream integration device 212 to indicate that the DisplayPort sink device 220 only supports resolutions that are capable of being carried over two lanes having maximum bandwidths indicated by the DPCD information in order to provide operation in USB 3.0 mode.

If the result of the determination in decision block 416 is YES, then the method 400 proceeds to block 422, where the AUX/USB controller 308 of the upstream integration device 208 configures a main link switching circuit 306 to be coupled to a source USB 3.0 TX channel and a source USB 3.0 RX channel. Next, at block 424, the AUX/USB controller of the downstream integration device 212 configures a main link switching circuit 312 to be coupled to a sink USB 3.0 TX channel and a sink USB 3.0 RX channel. The method 400 then proceeds to a continuation terminal ("terminal B").

Otherwise, if the result of the determination in decision block 416 is NO, then the method 400 proceeds to block 418, where the AUX/USB controller 308 of the upstream integration device 208 configures a main link switching circuit 306 of the upstream integration device 208 to be coupled to the source Lane 2 channel and the source Lane 3 channel. Next, at block 420, the AUX/USB controller 310 of the downstream integration device 212 configures a main link switching circuit 312 of the downstream integration device 212 to be coupled to the sink Lane 2 channel and the sink Lane 3 channel. The method 400 then proceeds to a continuation terminal ("terminal B").

The above coupling steps are exemplary only, and in other embodiments, the coupling of Lane 2 and Lane 3 to the main link switching circuits 306, 312 may happen at a different point. For example, the embodiment described above will cause a hard failure during link training. That is, in USB 3.0 mode, if the DisplayPort source device 302 attempts to send link training information to the DisplayPort sink device 220 on all four lanes, the DisplayPort sink device 220 will never receive the link training information on Lane 2 and Lane 3. The DisplayPort source device 302 may detect this error, and may subsequently attempt to resend the link training information only over Lane 0 and Lane 1 (or only Lane 0). In other embodiments, Lane 2 and Lane 3 may initially be coupled to the DisplayPort channels, and the main link switching circuits 306, 312 may not be switched into USB 3.0 mode until after link training has occurred, even when the devices are configured to operate in USB 3.0 mode.

From terminal B (FIG. 4A), the method 400 proceeds to a set of method steps 404 defined between a continuation terminal ("terminal C") and an exit terminal ("terminal D"). The set of method steps 404 describe steps in which DisplayPort configuration data (DPCD) is exchanged.

From terminal C (FIG. 4C), the method 400 proceeds to block 426, where the DisplayPort source device 302 transmits a DPCD request via a source AUX channel. At block 428, the AUX/USB control 308 of the upstream integration device 208 receives the DPCD request and transmits it to the downstream integration device 212 via a transit AUX/USB channel. At block 430, the AUX/USB controller 310 of the downstream integration device 212 receives the DPCD request and transmits it to the DisplayPort sink device 220 via a sink AUX channel. The method 400 then proceeds to block 432, where the AUX/USB control 310 of the downstream integration device 212 receives a DPCD response from the DisplayPort sink device 220 via the sink AUX channel.

The method 400 then proceeds to a decision block 434, where a determination is made as to whether the upstream integration device 208 and the downstream integration device 212 have been configured to operate in USB 3.0 mode. If the determination at decision block 434 results in "YES," the method proceeds to block 436, where the AUX/USB controller 310 of the downstream integration device 212 alters the DCPD response to indicate a maximum of two available lanes. In some embodiments, the DisplayPort sink device 220 may indicate an available number of rows in a Receiver Capabilities field of the DPCD, such as in a MAX_LANE_COUNT variable. The downstream integration device 212 may alter the value of this variable to indicate that no more than two lanes are available. Hence, the DisplayPort source device 302 should only attempt to transmit link training data to no more than two lanes. The method 400 then proceeds to a continuation terminal ("terminal C1").

In embodiments in which Lane 2 and Lane 3 are coupled to the USB 3.0 channels at the outset, this determination may be skipped, and the DPCD response may be passed through without alteration even in USB 3.0 mode, as the DisplayPort source device 302 should detect a hard failure during link training. However, even in embodiments wherein Lane 2 and Lane 3 are coupled to the USB channels at the outset, the determination in decision block 434 may be used to reserve Lane 2 and Lane 3 for USB 3.0 communication while avoiding the hard failure. In some embodiments, the DisplayPort sink device 220 may be made aware that the integration devices 208, 212 are configured to operate in USB 3.0 mode, and so the DisplayPort sink device 220 may not report that more than two lanes are available in the DPCD transmitted to the downstream integration device 212.

If the determination at decision block 434 results in "NO," the method 400 proceeds to a continuation terminal ("terminal C1"). From terminal C1, the method 400 proceeds to block 438, where the AUX/USB controller 310 of the downstream integration device 212 transmits the DPCD response (altered or unaltered) to the upstream integration device 208 via the transit AUX/USB channel. At block 440, the AUX/USB controller 308 of the upstream integration device 208 receives the DPCD response and transmits it to the DisplayPort source device 302 via the source AUX channel. The method 400 then proceeds to a continuation terminal ("terminal D").

From terminal D (FIG. 4A), the method 400 proceeds to a set of method steps 406 defined between a continuation terminal ("terminal E") and an exit terminal ("terminal F"). The set of method steps 406 describe steps in which link training information is exchanged.

From terminal E (FIG. 4D), the method 400 proceeds to block 442, where the DisplayPort source device 302 transmits link training information to the upstream integration device 208, and the upstream integration device 208 transmits the link training information to the DisplayPort sink device 220 via the downstream integration device 212. In some embodiments, the DisplayPort source device 302 may transmit the link training information over all four lanes, regardless of whether the integration devices 208, 212 are configured to operate in USB 3.0 mode. In some embodiments, the DisplayPort source device 302 may be aware that the integration devices 208, 212 are configured in USB 3.0 mode via a software setting, a firmware setting, a hard-coded logic gate, and/or the like, and may therefore only attempt to use Lane 0 and Lane 1.

Next, at block 444, the DisplayPort source device 302 transmits a link training DPCD request via the sink AUX channel. Such a request for DPCD information may be used by the DisplayPort source device 302 to check status registers made available by the DisplayPort sink device 220, and thereby check to see whether the DisplayPort sink device 220 is reporting that the link training information was successfully received. At block 446, the AUX/USB controller 310 of the downstream integration device 212 receives the link training DPCD response from the DisplayPort sink device 220.

At decision block 446, a determination is made as to whether the integration devices 208, 212 have been configured to operate in USB 3.0 mode, and if the link training DPCD response indicates that the link training information was received by the DisplayPort sink device 220 on Lane 2 or Lane 3. If the integration devices 208, 212 have not been configured to operate in USB 3.0 mode, or if the link training DPCD response indicates that the link training information was not received by the DisplayPort sink device 220 on Lane 2 or Lane 3, then no changes to the link training DPCD response are necessary. The link training information may not have been received because the DisplayPort source device 302 may not have attempted to send it over Lane 2 or Lane 3, because Lane 2 and Lane 3 were connected to the USB 3.0 channels, or for any other reason.

However, if the integration devices 208, 212 have been configured to operate in USB 3.0 mode and if the link training DPCD response indicates that the link training information was successfully received on Lane 2 or Lane 3, then the link training DPCD response should be altered to "soft fail" the link training until the DisplayPort source device 302 stops attempting to train Lane 2 and Lane 3. Accordingly, if the determination at decision block 446 results in "YES," then the method 400 proceeds to block 448, where the AUX/USB controller 310 of the downstream integration device 212 alters the link training DPCD response to indicate that Lane 2 and Lane 3 have not synced. In some embodiments, the AUX/USB controller 310 may read the bit fields for a LANE2_CR_DONE value and a LANE3_CR_DONE value in a LANE2_3_STATUS register, and may clear the values if present to prevent the DisplayPort source device 302 from completing clock recovery (CR) lock on Lane 2 and Lane 3. The AUX/USB controller 310 may also ensure that an ADJUST_REQUEST_LANE2_3 register remains at its default state. The method 400 then proceeds to block 450, where the downstream integration device 212 transmits the altered link training DPCD response to the DisplayPort source device 302 via the upstream integration device 208. The method 400 then proceeds to a continuation terminal ("terminal E1").

If the result of the determination at decision block 446 was "NO," then the method 400 proceeds to block 452, where the downstream integration device 212 transmits the link training DPCD response to the DisplayPort source device 302 via the upstream integration device 208. In this case, the link training DPCD response may be transmitted without making any substantial changes.

The method 400 then proceeds to a continuation terminal ("terminal E1"), and then to a decision block 453, where a determination is made by the DisplayPort source device 302 as to whether the link training DPCD response indicates that all of the transmitted link training information was successfully received. If the result of the determination is "YES," then the method 400 proceeds to a continuation terminal ("terminal F"). If the result of the determination is "NO," then the DisplayPort source device 302 retries training the link, and therefore the method 400 returns to terminal E. In some embodiments, the DisplayPort source device 302 may make multiple attempts to train the link using Lanes 2 and 3 even after detecting a failure, but may eventually attempt to train the link using less than all four lanes.

Figure 4A:
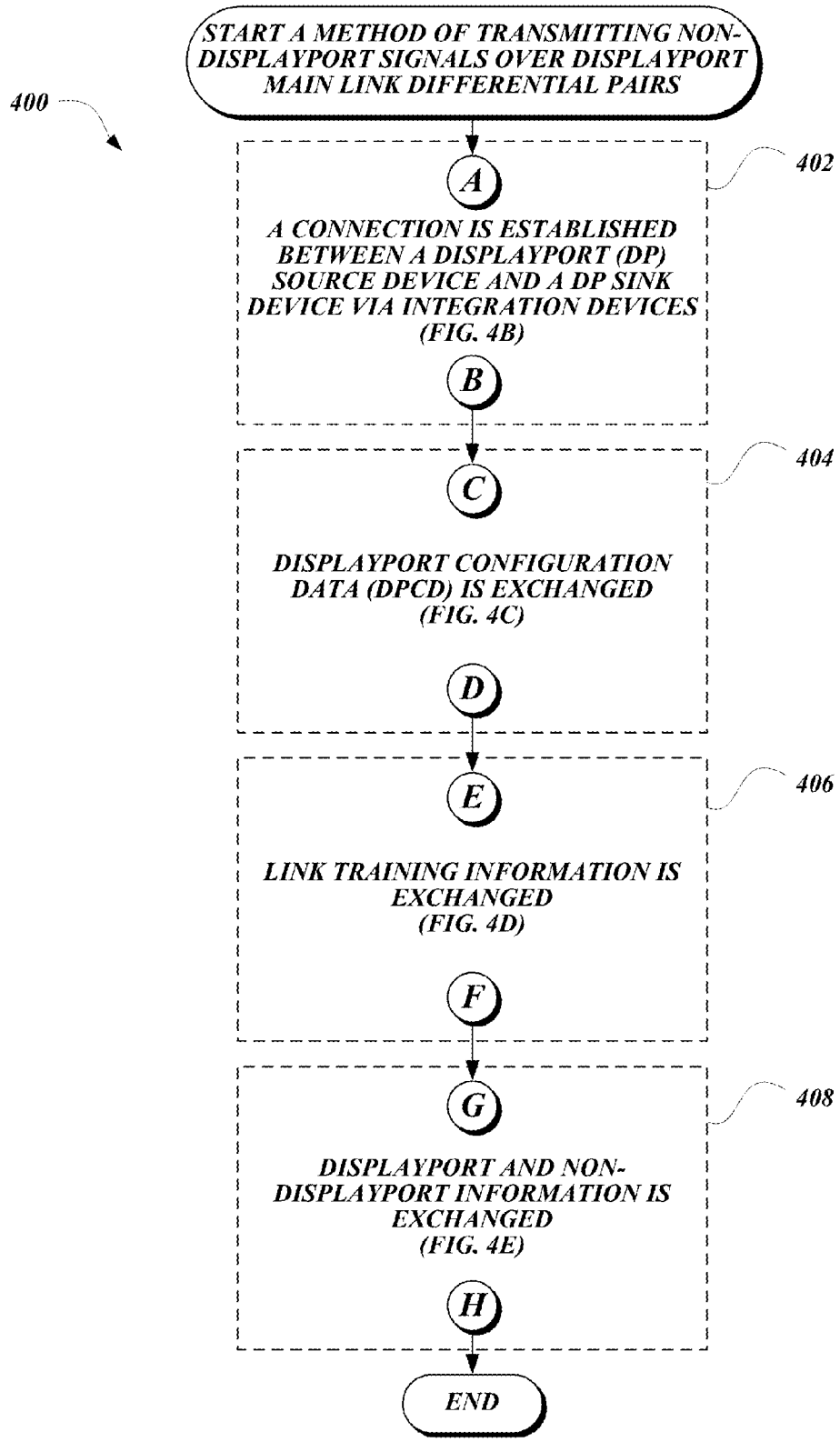
FIGS. 4A-4E illustrate an exemplary embodiment of a method of transmitting non-DisplayPort signals over DisplayPort main link channels according to various aspects of the present disclosure.
Figure 4B:
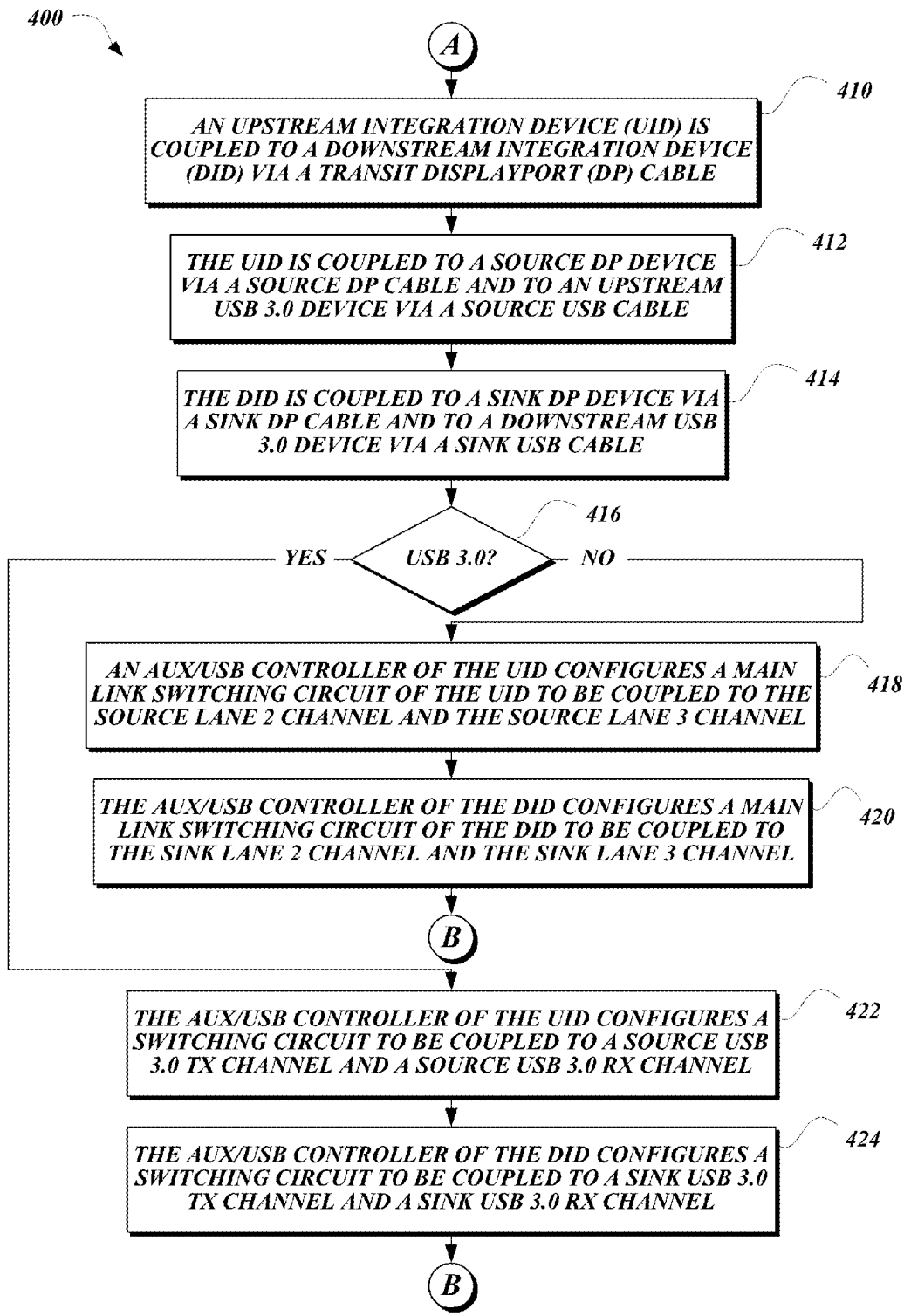
Figure 4C:
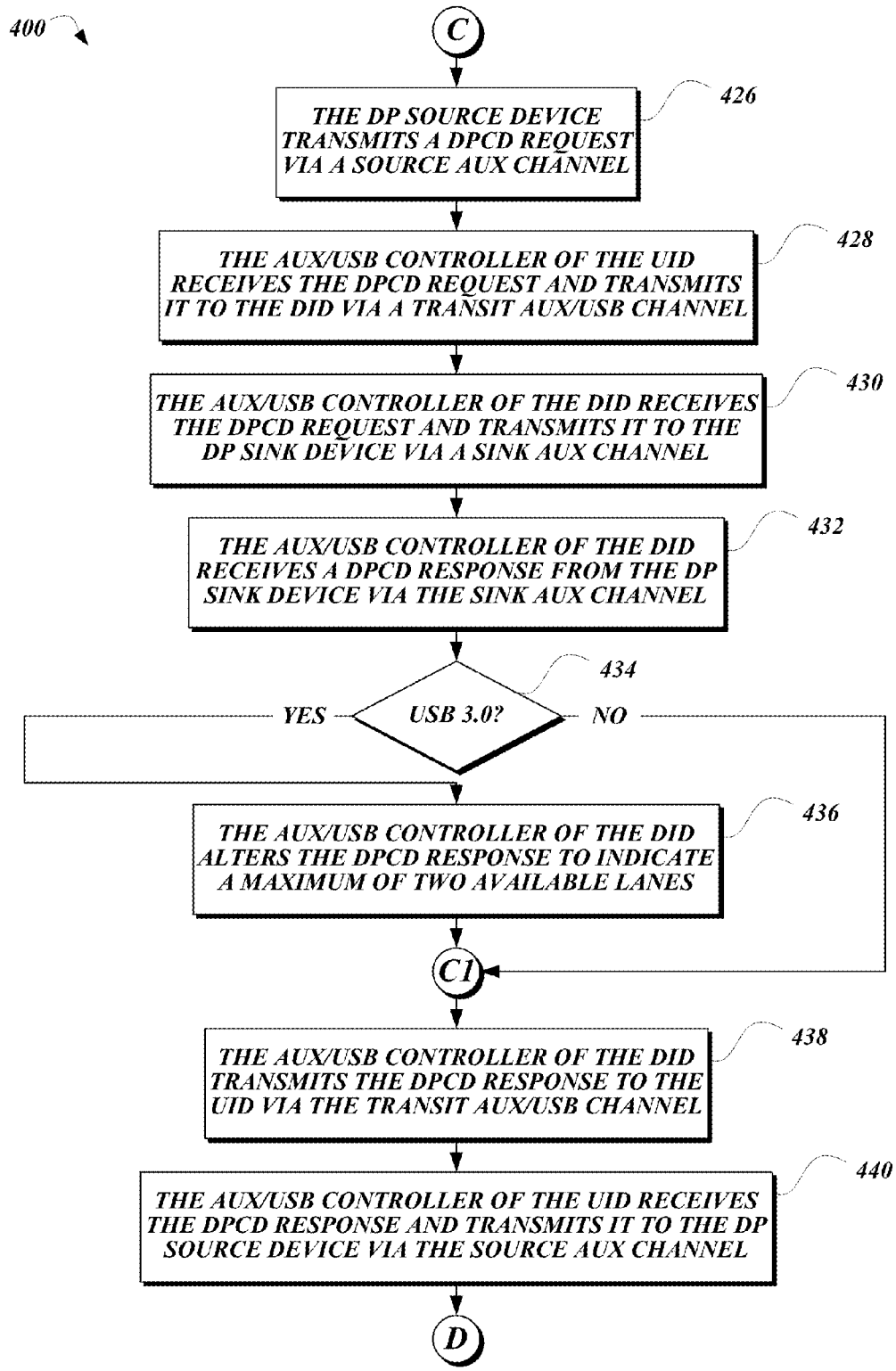
Figure 4D:
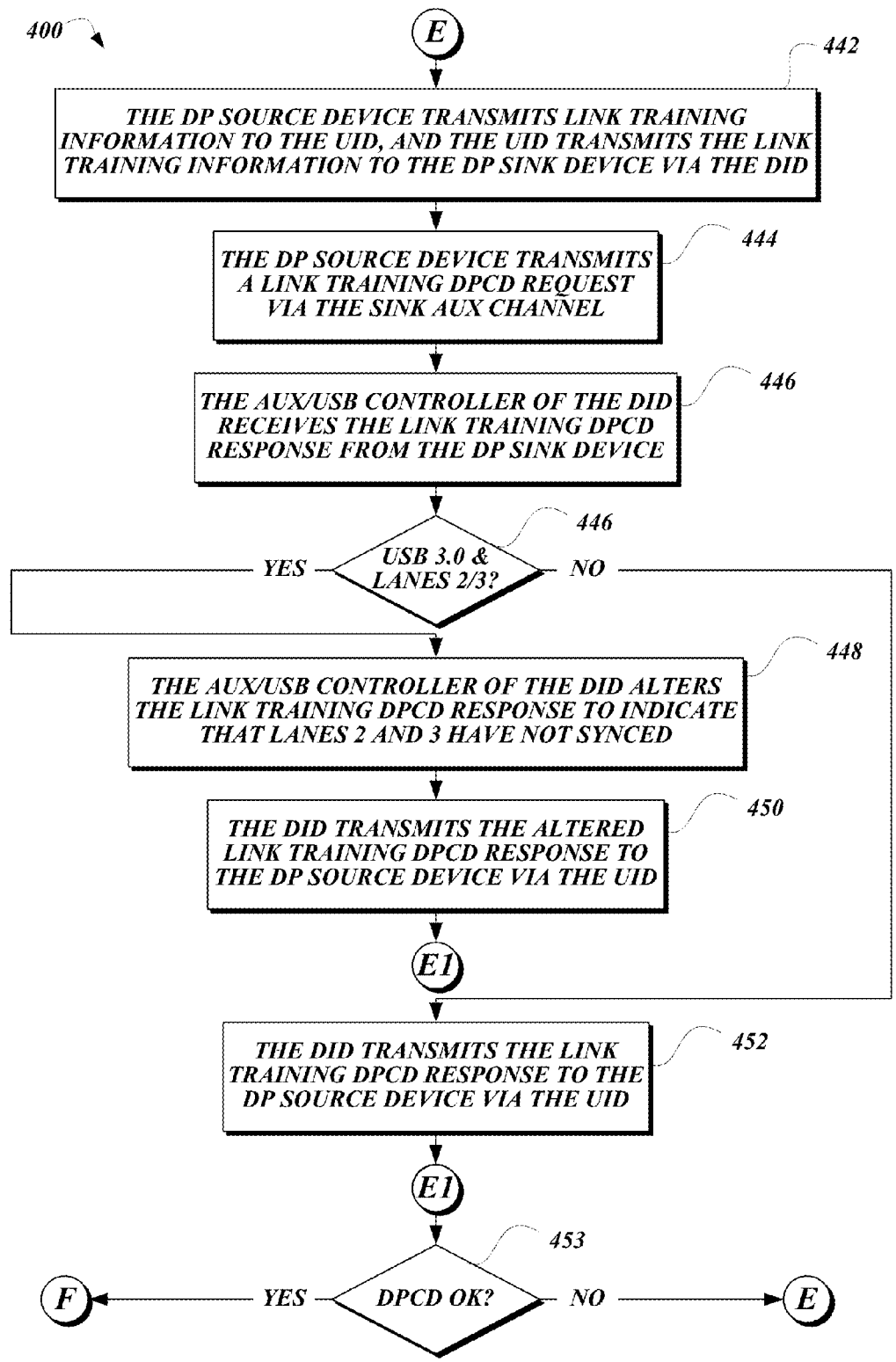
Figure 4E:
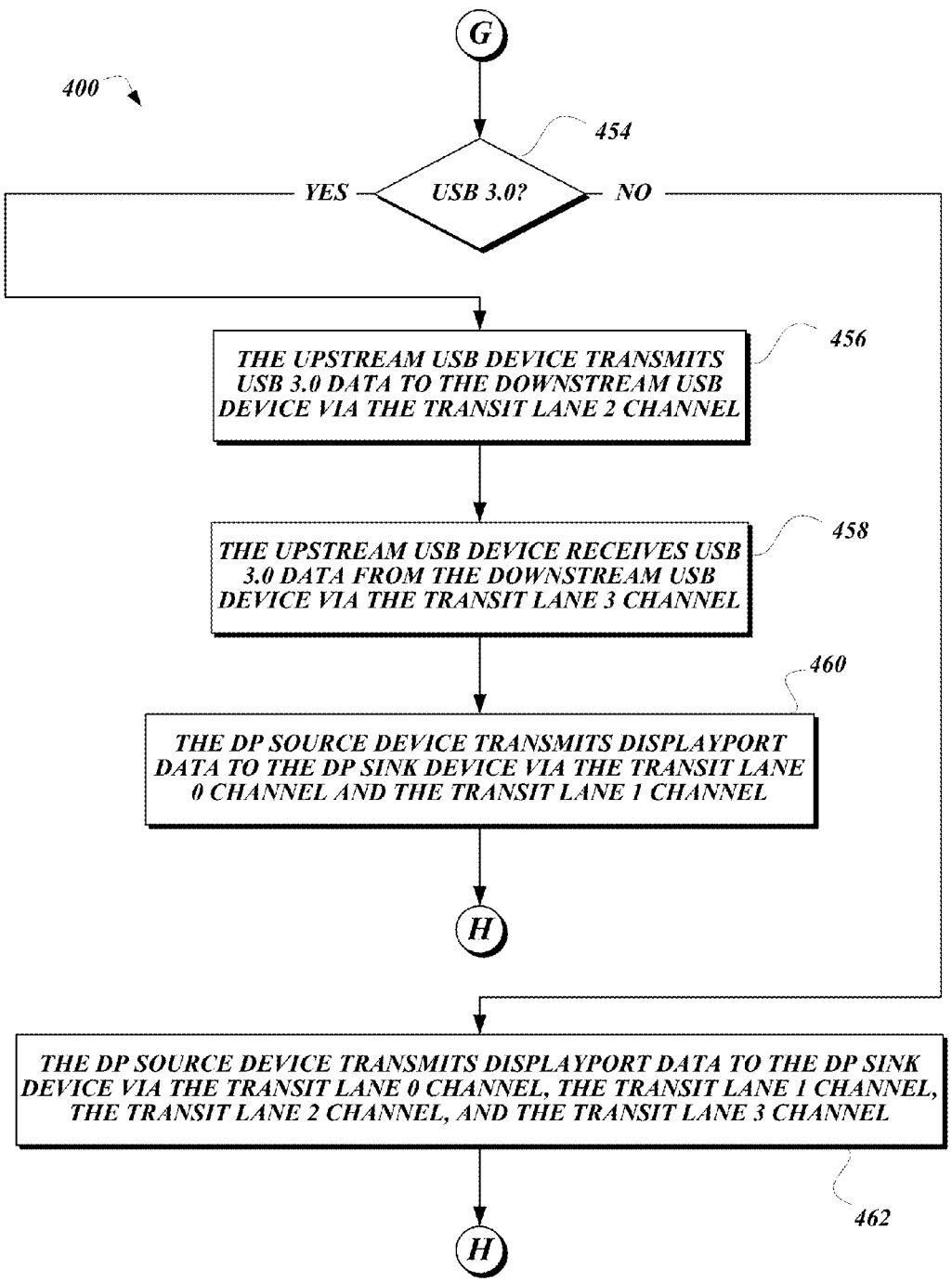

From terminal F (FIG. 4A), the method 400 proceeds to a set of method steps 408 defined between a continuation terminal ("terminal G") and an exit terminal ("terminal H"). The set of method steps 408 describe steps in which DisplayPort and non-DisplayPort information (e.g., USB 3.0 information) is exchanged. From terminal G (FIG. 4E), the method 400 proceeds to a decision block 454, where a determination is made as to whether the integration devices 208, 212 have been configured to operate in USB 3.0 mode. If the result of the determination at block 454 is "YES," then the method 400 proceeds to block 456. In some embodiments, wherein the switching to USB 3.0 mode by the main link switching circuits 306, 312 illustrated in FIG. 4B does not occur until after link training is completed, said switching may occur at this point. At block 456, the upstream USB device 304 transmits USB 3.0 data to the downstream USB device 216 via the transit Lane 2 channel, and at block 458, the upstream USB device 304 receives USB 3.0 data from the downstream USB device 216 via the transmit Lane 3 channel. At block 460, the DisplayPort source device 302 transmits DisplayPort data to the DisplayPort sink device 220 via the transit Lane 0 channel and the transit Lane 1 channel. These transmissions may be substantially similar to transmissions between the DisplayPort source device 302 and the DisplayPort sink device 220, and between the upstream USB device 304 and the downstream USB device 216, if they were coupled directly to each other with a standard DisplayPort cable and a standard USB cable, respectively. The method 400 then proceeds to a continuation terminal ("terminal H").

If the result of the determination at block 454 is "NO," then the method 400 proceeds to block 462, where the DisplayPort source device 302 transmits DisplayPort data to the DisplayPort sink device 220 via the transit Lane 0 channel, the transmit Lane 1 channel, the transit Lane 2 channel, and the transit Lane 3 channel. This main line transmission may be substantially similar to DisplayPort main line data transmission between the DisplayPort source device 302 and the DisplayPort sink device 220 if they were coupled directly to each other with a standard DisplayPort cable. In some embodiments, the DisplayPort source device 302 may transmit data only on Lane 0, only on Lanes 0 and 1, or on all four of Lanes 0, 1, 2, and 3, even when all four Lanes are coupled to the main link switching circuits 306, 312. The method 400 then proceeds to a continuation terminal ("terminal H"). From terminal H (FIG. 4A), the method 400 proceeds to an end block and terminates.

Before, during, and after the method 400 of configuring the main link channels described above, the DPCD request, the DPCD response, the link training DPCD response, and other status information may be exchanged via the source AUX/FAUX channel and the sink AUX/FAUX channel. The AUX/USB controllers 308, 310 may exchange this type of information via the transit AUX/USB channel. Also, before, during, and after the method 400 of configuring the main link channels, the upstream USB device 304 and the downstream USB device 216 may exchange low-speed, full-speed, or high-speed USB information via the source USB TX/RX channel and the sink USB TX/RX channel. The AUX/USB controllers 308, 310 may exchange this type of information via the transit AUX/USB channel, interleaving the USB information with the DisplayPort AUX information via any suitable technique.

Some embodiments of the present disclosure may enable dynamic link reconfiguration. For example, it might not be desired to use Lane 2 and Lane 3 for non-DisplayPort information when the connection is first established, though it may be desired to switch over to Lane 2 and Lane 3 for non-DisplayPort information thereafter, such as a situation when a downstream USB device 216 is first plugged into the downstream integration device 212 after the initial connection is established and the devices are already exchanging Display- Port data over all of the main link channels. As another example, a downstream USB device 216 may be unplugged from the downstream integration device 212 after the integration devices 208, 212 were previously configured in USB 3.0 mode, and it may be desired to begin transmitting DisplayPort information across all four lanes of the main link instead of allowing Lane 2 and Lane 3 to remain idle.

In some embodiments, such "hot swapping" to and from USB 3.0 mode may be performed by causing the DisplayPort source device 302 and the DisplayPort sink device 220 to re-attempt to perform link training, such that a method such as method 400 may be performed to establish either full-bandwidth DisplayPort communication or shared DisplayPort/USB communication.

Any suitable method for causing link training to reoccur after a hot swap is detected may be used. During normal operation, the DisplayPort sink device 220 may generate a Hot Plug Detect (HPD) signal, which is transmitted by the downstream integration device 212 and the upstream integration device 208 to the DisplayPort source device 302. In some embodiments, the downstream integration device 212 may manipulate the HPD signal to cause link training to be performed again.

For example, the downstream integration device 212 may simulate an HPD unplug event by forcing the HPD signal transmitted over the transit DisplayPort cable 210 to a low state for a predetermined amount of time, such as an HPD_Timeout period. Once the DisplayPort source device 302 detects that the HPD signal has been low for at least the HPD_Timeout period, the DisplayPort source device 302 determines that it has detected a disconnect event. Subsequently, the downstream integration device 212 may return the HPD signal to a high state, which causes the DisplayPort source device 302 to detect a connect event and to re-start the link training process, and allows the method 400 to be performed.

In some embodiments, the DisplayPort sink device 220 may request an interrupt and that the DisplayPort source device 302 check its DPCD by transmitting an IRQ_HPD pulse. As another example of manipulating the HPD signal, the downstream integration device 212 may itself generate an IRQ_HPD pulse and transmit it to the DisplayPort source device 302. In response, the DisplayPort source device 302 may transmit a DPCD request to the DisplayPort sink device 220. The downstream integration device 212 may intercept the DPCD response from the DisplayPort sink device 220, and may modify contents of the DPCD registers to simulate one or more of a loss of clock, symbol lock, or inter-lane alignment before returning the DPCD response to the DisplayPort source device 302. The simulated loss of synchronization causes the DisplayPort source device 302 to attempt to re-train the link. In some embodiments, such as embodiments including an multi-stream topology (MST) upstream device and a DisplayPort sink device 220 that supports a version of DPCD of 1.2 or higher, a DPCD address region of 0x2002 to 0x200F may be read, which includes additional bit fields that indicate that the Receiver Capabilities have changed. In such an embodiment, a value such as an RX_CAP_CHANGED bit in a LINK_SERVICE_IRQ_VECTOR_ESIO field may be set to indicate that a different number of main link lanes are available. Subsequently, the technique described above with respect to altering the MAX_LANE_COUNT reported in the DPCD response may be used to change the lanes used by the DisplayPort source device 302 for DisplayPort data.

In some embodiments, the termination of the AUX channel may be manipulated to provoke the DisplayPort source device 302 and DisplayPort sink device 220 into re-training the link. In normal operation, an AUX channel between an upstream device and a downstream device is terminated by the upstream device weakly pulling down the AUX+ line to GND and the AUX− line to DP_PWR. In normal operation of the system disclosed herein, the AUX channel of each DisplayPort cable is appropriately terminated by the connected devices. For example, the DisplayPort source device 302 may weakly pull down the AUX+ line of the source AUX/FAUX channel to GND, and the AUX− line of the source AUX/FAUX channel to DP_PWR, while the upstream integration device 208 does the same for the transit AUX/FAUX channel, and the downstream integration device 212 does the same for the sink AUX/FAUX channel.

To force a disconnect, the downstream device detects the AUX channel in a disconnect state, which includes the AUX+ line weakly pulled high and the AUX− line weakly pulled low. Accordingly, the downstream integration device 212 may simulate a disconnect event by disabling the AUX channel termination between the AUX/USB controller 310 and the DisplayPort sink device 220. In response, the DisplayPort sink device 220 enters a disconnect state, and ceases assertion of the HPD signal. Once the DisplayPort source device 302 detects that the HPD signal is low for a predetermined amount of time, the DisplayPort source device 302 detects the disconnect event, similar to the discussion above. To start the re-training process, the downstream integration device 310 may re-enable the AUX channel termination between the AUX/USB controller 310 and the DisplayPort sink device 220, causing the DisplayPort sink device 220 to detect a connect event, assert the HPD signal, and begin the link training process.

In some embodiments of the method 400, actions described above as performed by the downstream integration device 212 may instead be performed by the upstream integration device 208, and vice versa. As one nonlimiting example, though the AUX/USB controller 310 of the downstream integration device 212 is described as intercepting and modifying the DPCD responses, in some embodiments, the AUX/USB controller 310 of the downstream integration device 212 may simply transmit the DCPD responses to the upstream integration device 208, and the AUX/USB controller of the upstream integration device 208 may inspect and modify the DCPD responses when appropriate before transmitting them to the DisplayPort source device 302.

As another example, in some embodiments, the DisplayPort source device 302 may be configured to receive a command generated by one of the integration devices 208, 212 that indicates to the DisplayPort source device 302 that it should only attempt to use Lanes 0 and 1. As another example, in some embodiments, the DisplayPort sink device 220 may be configured to receive a command generated by one of the integration devices 208, 212 that indicates to the DisplayPort sink device 220 that it should only advertise a maximum lane count of two lanes.

In some embodiments, the upstream integration device 208 and the downstream integration device 212 may be computing devices that include one or more general purpose processors, a memory, and a nontransitory computer-readable storage medium having computer-executable instructions stored thereon that, in response to execution by one or more of the general purpose processors, cause the computing device to perform the actions described herein. In some embodiments, the computing devices may include circuitry that is specially configured to perform the actions described herein, such as a FPGA and/or the like. In some embodiments, a single computing device may be configurable to act as either an upstream integration device 208 or a downstream integration device 212, based on a firmware configuration setting, a position of a hardware switch, and/or the like.

Though only one DisplayPort sink device 220 and downstream USB device 216 are illustrated, in some embodiments, more than one DisplayPort sink device and/or more than one downstream USB device may be included, in accordance with the DisplayPort and USB specifications, and as would be understood by one of ordinary skill in the art.

Though particular channels, differential pairs, and conductors are discussed above, in some embodiments, other channels, differential pairs, and conductors may be used for similar purposes without departing from the scope of the present disclosure. For example, though it may be beneficial to use a standard DisplayPort cable to connect the upstream integration device 208 and the downstream integration device 212, in some embodiments, a custom cable may be used. As another example, though the source Lane 2 channel is described as couplable to the transit Lane 2 channel, and the USB 3.0 TX channel is described as couplable to the transit Lane 2 channel, in other embodiments the source channels could be couplable to different transit channels, as long as a corresponding connection is made between the transit channels and the sink channels.

One of ordinary skill in the art will recognize that, in some embodiments, similar techniques may be used with technologies other than DisplayPort and/or USB, either presently known or developed in the future. That is, other transmission protocols may be combined in a similar manner when the two protocols are transmittable over the same transmission medium, and when the first transmission protocol may use a less than a total number of variable transmission channels. When present, data may be transmitted using the second transmission protocol over the variable transmission channels not being used by the first transmission protocol, and an integration device may be used to switch between the two and to cause the first protocol to use less than the total number of variable transmission channels. For example, in some embodiments, instead of USB 3.0 data, the Lane 2 channel and Lane 3 channel may be used to transmit (e)SATA information, PCIe information, and/or the like.

In some embodiments, additional adaptors may be included between the communicating computing devices described herein. For example, because communication between the upstream integration device 208 and the downstream integration device 212 may be taking place over a DisplayPort cable, a DisplayPort extender may be used to extend the range between the upstream integration device 208 and the downstream integration device 212. Likewise, USB extension devices may also be used without departing from the scope of the present disclosure.

While illustrative embodiments have been illustrated and described, it will be appreciated that various changes can be made therein without departing from the spirit and scope of the invention.

The invention claimed is:

1. An integration device for selectively communicating DisplayPort and non-DisplayPort information over a DisplayPort cable, the device comprising:
a main link switching circuit configured to selectively couple channels of a first DisplayPort cable and one or more channels of a non-DisplayPort cable to one or more channels of a second DisplayPort cable; and
a controller configured to:
in response to determining that the device is configured to operate in a first mode:
cause the main link switching circuit to couple the channels of the first DisplayPort cable to the channels of the second DisplayPort cable; and
in response to determining that the device is configured to operate in a second mode:
cause the main link switching circuit to couple the one or more channels of the non-DisplayPort cable to the one or more channels of the second DisplayPort cable; and
cause a DisplayPort source device to transmit DisplayPort data over less than all of a set of main link channels by:
receiving DisplayPort configuration data (DPCD) from a DisplayPort sink device;
altering the DPCD; and
transmitting the altered DPCD to the DisplayPort source device;
wherein altering the DPCD includes altering a maximum number of available lanes indicated by the DPCD or altering a link training response value to indicate that clock recovery on at least one lane was unsuccessful.

2. The integration device of claim 1, further comprising circuitry configured to couple a Lane 0 channel and a Lane 1 channel of the first DisplayPort cable to a Lane 0 channel and a Lane 1 channel of the second DisplayPort cable.

3. The integration device of claim 1, wherein the integration device is configured to operate in the first mode or the second mode based on whether connection of a non-DisplayPort cable to the integration device is automatically detected by the integration device.

4. The integration device of claim 1, wherein the non-DisplayPort information is USB 3.0 information.

5. The integration device of claim 1, wherein the controller is further configured to:
cause the device to switch between operating in the first mode and the second mode based on detecting a presence or an absence of a non-DisplayPort device; and
cause a DisplayPort source device and a DisplayPort sink device to perform link training upon the switch between operating in the first mode and the second mode.

6. The integration device of claim 5, wherein the controller is configured to cause the DisplayPort source device and the DisplayPort sink device to perform link training by manipulating termination of an AUX channel.

7. The integration device of claim 5, wherein the controller is configured to cause the DisplayPort source device and the DisplayPort sink device to perform link training by manipulating a hot plug detect (HPD) signal.

8. A method of selectively communicating DisplayPort and non-DisplayPort information over a DisplayPort cable, the method comprising:
in response to determining that an integration device is configured to operate in a first mode, causing a main link switching circuit to couple channels of a first DisplayPort cable to channels of a second DisplayPort cable; and
in response to determining that the integration device is configured to operate in a second mode:
causing the main link switching circuit to couple one or more channels of a non-DisplayPort cable to one or more channels of the second DisplayPort cable; and
causing a DisplayPort source device to transmit DisplayPort data over less than all of a set of main link channels by:
receiving display port configuration data (DPCD) from a DisplayPort sink device;

altering the DPCD; and transmitting the altered DPCD to a DisplayPort source device;

wherein altering the DPCD includes altering a maximum number of available lanes indicated by the DPCD or altering a link training response value to indicate that clock recovery on at least one lane was unsuccessful.

9. The method of claim 8, wherein altering the maximum number of available lanes indicated by the DPCD includes altering a MAX_LANE_COUNT variable in a Receiver Capabilities field of the DPCD.

10. The method of claim 8, wherein altering the value to indicate that clock recovery on at least one lane was unsuccessful includes clearing a LANE2_CR_DONE value or a LANE3_CR_DONE value in a LANE2_3_STATUS register of the DPCD.

11. The method of claim 10, wherein altering the value to indicate that clock recovery on at least one lane was unsuccessful includes leaving an ADJUST_REQUEST_LANE2_3 register of the DPCD at a default value.

12. A nontransitory computer-readable storage medium having computer-executable instructions stored thereon that, in response to execution by one or more processors of a computing device, cause the computing device to perform actions for selectively communicating DisplayPort and non-DisplayPort information over a DisplayPort cable, the actions comprising:

in response to determining that the computing device is configured to operate in a first mode, causing a main link switching circuit to couple channels of a first DisplayPort cable to channels of a second DisplayPort cable; and in response to determining that the computing device is configured to operate in a second mode:

causing the main link switching circuit to couple one or more channels of a non-DisplayPort cable to one or more channels of the second DisplayPort cable; and causing a DisplayPort source device to transmit DisplayPort data over less than all of a set of main link channels by:

receiving display port configuration data (DPCD) from a DisplayPort sink device;

altering the DPCD; and transmitting the altered DPCD to a DisplayPort source device;

wherein altering the DPCD includes altering a maximum number of available lanes indicated by the DPCD or altering a link training response value to indicate that clock recovery on at least one lane was unsuccessful.

13. The nontransitory computer-readable medium of claim 12, wherein altering the maximum number of available lanes indicated by the DPCD includes altering a MAX_LANE_COUNT variable in a Receiver Capabilities field of the DPCD.

14. The nontransitory computer-readable medium of claim 12, wherein altering the value to indicate that clock recovery on at least one lane was unsuccessful includes clearing a LANE2_CR_DONE value or a LANE3_CR_DONE value in a LANE2_3_STATUS register of the DPCD.

15. The nontransitory computer-readable medium of claim 14, wherein altering the value to indicate that clock recovery on at least one lane was unsuccessful includes leaving an ADJUST_REQUEST_LANE2_3 register of the DPCD at a default value.

* * * * *